United States Patent [19]
Watanabe et al.

[11] Patent Number: 6,018,443
[45] Date of Patent: Jan. 25, 2000

[54] THIN FILM MAGNETIC HEAD HAVING HARD FILMS FOR MAGNETIZING A SHIELD LAYER IN A SINGLE DOMAIN STATE

[75] Inventors: Toshinori Watanabe; Masamichi Saito, both of Niigata-Ken, Japan

[73] Assignee: Alps Electric Co., Ltd., Yokohama, Japan

[21] Appl. No.: 09/070,285

[22] Filed: Apr. 30, 1998

[30] Foreign Application Priority Data

May 8, 1997 [JP] Japan ................................. 9-118349

[51] Int. Cl.⁷ .......................................................... G11B 5/39
[52] U.S. Cl. ................................................................. 360/113
[58] Field of Search .................................................. 360/113

[56] References Cited

U.S. PATENT DOCUMENTS 5,515,221  5/1996  Gill et al. .
5,880,910  3/1999  Shouji ........................................ 360/113

Primary Examiner—A. J. Heinz
Attorney, Agent, or Firm—Brinks Hofer Gilson & Lione

[57] ABSTRACT

Hard films consisting of a permanent magnet material are formed on both the sides of shield layers to orient the magnetization of the shield layers in an easy axis of magnetization (X direction), thereby putting the shield layers into a single domain state. Therefore, anisotropic dispersion does not occur in the shield layers, the hysteresis of a thin film magnetic head is eliminated as a whole, a coercive force becomes very small, and the magnetic reversibilities of the shield layers in a direction perpendicular to the drawing paper surface becomes preferable. For this reason, the reliability of a reproduced output signal from a magnetoresistance element layer is improved.

22 Claims, 8 Drawing Sheets

THIN FILM MAGNETIC HEAD HAVING HARD FILMS FOR MAGNETIZING A SHIELD LAYER IN A SINGLE DOMAIN STATE

BACKGROUND OF THE INVENTION

1. Field of the Invention

The present invention relates to a combined MR (Magnetoresistance)/Inductive thin film magnetic head mounted on, e.g., a hard disk drive and, more particularly, to a thin film magnetic head in which reproducing characteristics are improved by putting the magnetization of a shield layer into a single domain state.

2. Description of the Related Art

Figure 8:
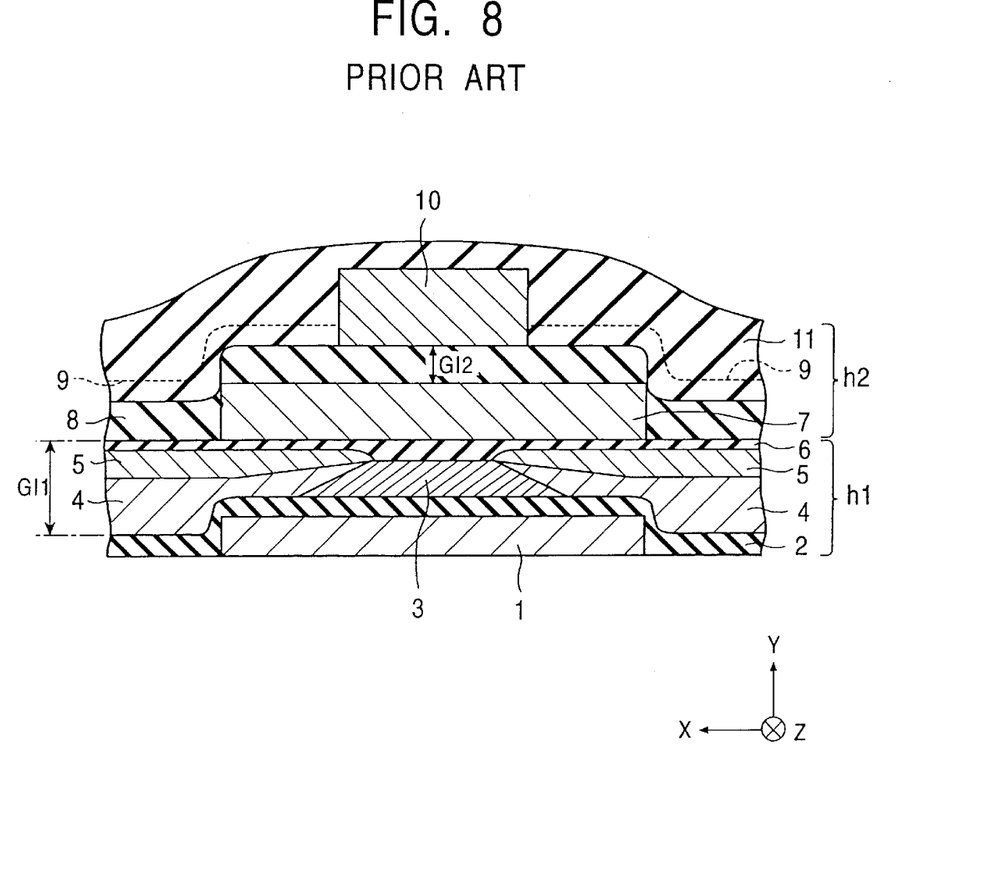
FIG. 8 is an enlarged sectional view showing the structure of a first conventional thin film magnetic head.

FIG. 8 is an enlarged sectional view showing a conventional thin film magnetic head viewed from the side opposing a recording medium.

This thin film magnetic head has the following arrangement. That is, a read head h1 using a magnetoresistance effect and a write inductive head h2 are stacked on the end face on a trailing side of a slider which constitutes, e.g., a floating type head.

A lower shield layer 1 serving as the lowest layer of the thin film magnetic head shown in FIG. 8 consists of a soft magnetic material such as Sendust or an Ni—Fe alloy (permalloy). The Sendust is generally known as a soft isotropic magnetic material, and the permalloy is generally known as a soft magnetic material having uniaxial anisotropy.

A lower gap layer 2 consisting of a non-magnetic material such as an $Al_2O_3$ (aluminum oxide) is formed on the upper surface of the lower shield layer 1. A magnetoresistance element layer 3 is formed on the upper surface of the lower gap layer 2. The magnetoresistance element layer 3 is constituted by three layers which are a soft magnetic layer (SAL layer: soft adjacent layer), a non-magnetic layer (SHUNT layer), and a magnetoresistance layer (MR layer) sequentially laminated from the bottom. In general, the magnetoresistance layer is an Ni—Fe alloy (permalloy) layer, and the non-magnetic layer is a Ta (tantalum) layer. The soft magnetic layer consists of an Ni—Fe—Nb alloy.

Hard bias layers 4 are formed as longitudinal bias layers on both the sides of the magnetoresistance element layer 3. A longitudinal bias magnetic field in the hard bias layer 4 is oriented in an X direction, and the MR layer of the magnetoresistance element layer 3 is oriented in the X direction in FIG. 8, so that a single magnetic domain state can be obtained.

A main lead layer 5 consisting of a non-magnetic material such as Cu (copper) or W (tungsten) having a low electric resistance is formed on the upper surface of the hard bias layer 4. An upper gap layer 6 consisting of a non-magnetic material such as alumina is formed on the upper surface of the main lead layer 5.

An upper shield layer (lower core layer) 7 is formed on the upper surface of the upper gap layer 6 by plating a permalloy or the like. The upper shield layer 7 has a core function on the reading side of the inductive head h2 and an upper shield function for the read head h1. On the read head h1, a gap length Gl1 is determined by an interval between the lower shield layer 1 and the upper shield layer 7.

A gap layer (non-magnetic material layer) 8 consisting of alumina or the like and an insulating layer (not shown) consisting of polyimide or a resist material are laminated on the upper surface of the upper shield layer 7, and a coil layer 9 which is patterned to have a spiral shape is formed on the upper surface of the insulating layer. The coil layer 9 consists of a non-magnetic electrically conductive material such as Cu (copper) having a low electric resistance. The coil layer 9 is surrounded by an insulating layer (not shown) consisting of polyimide or a resist material, and an upper core layer 10 consisting of a magnetic material such as a permalloy is formed on the upper surface of the insulating layer by plating. The upper core layer 10 functions as a core portion on the trailing side of the inductive head h2 for giving a recording magnetic field to a recording medium.

The upper core layer 10 opposes a magnetic gap through the gap layer 8 on the upper shield layer 7 on the side opposing the recording medium as shown in FIG. 8. The magnetic gap has a magnetic gap length Gl2 and gives a recording magnetic field to a recording medium. A protective layer 11 consisting of alumina is arranged on the upper core layer 10.

On the read head h1, the MR layer of the magnetoresistance element layer 3 has a resistance which is changed by the external magnetic field (direction perpendicular to the drawing paper surface). On the read head h1, signals of the recording medium are read by using the change in resistance.

The shield layers 1 and 7 are formed on the upper and lower surfaces of the MR layer, and Barkhousen noise caused by the changes of irregular magnetic domains of the shield layers 1 and 7 is transmitted to the MR layer by an mutual effect and adversely affects an output signal from the MR layer.

In order to improve the reliability of the output signal from the MR layer, external noise flowing into the MR layer of the magnetoresistance element layer 3 must be reduced. For this purpose, the following scheme is considered. That is, the magnetization directions of the lower shield layer 1 and the upper shield layer 7 are oriented in an easy axis (X direction) of magnetization, thereby putting into the lower and the upper shield layers 1 and 7 into a single magnetic domain state, and the magnetization inversion (magnetic reversibility) of the shield layers 1 and 7 must be made preferable.

As a method of controlling the magnetization directions of the shield layers 1 and 7, the following method is conventionally used. That is, when the lower shield layer 1 and the upper shield layer 7 consist of a soft magnetic material which can give uniaxial anisotropy like a permalloy or a Co (cobalt)-based amorphous alloy, film formation and an annealing process are performed in a magnetic field such that the easy axes of the lower shield layer 1 and the upper shield layer 7 are oriented in the X direction shown in FIG. 8, or magnetization is performed such that the X direction becomes the easy axis of magnetization after the film formation and the annealing process.

However, even if film formation and an annealing process are performed in a magnetic field, the magnetization directions of the lower shield layer 1 and the upper shield layer 7 are not completely oriented in the easy axis of magnetization (X direction). More specifically, in the lower shield layer 1 and the upper shield layer 7, there are some groups of magnetic moments which are inclined in a directions slightly shifted from the average easy axis of magnetization. That is, a state wherein magnetic anisotropy is dispersed (anisotropic dispersion) is macroscopically accomplished.

When anisotropic dispersion occurs in the lower shield layer 1 and the upper shield layer 7, the hysteresis of the thin film magnetic head expands as a whole to increase a coercive force. For this reason, not only the magnetic reversibilities of the shield layers 1 and 7 in a hard axis of magnetization (vertical direction in FIG. 8) are degraded, but also Barkhousen noise transmitted to the MR layer of the magnetoresistance element layer 3 which can obtain a magnetoresistance effect increases. As a result, the reliability of an output signal is considerably degraded with respect to reproducing characteristics in, especially, a high-frequency region.

When the magnetic reversibilities of the shield layers 1 and 7 are degraded, the following problem also arises. That is, a shield function inherent in a shield layer such as a function of shielding the MR layer of the magnetoresistance element layer 3 from recording noise of a recording medium is degraded.

Figure 9:
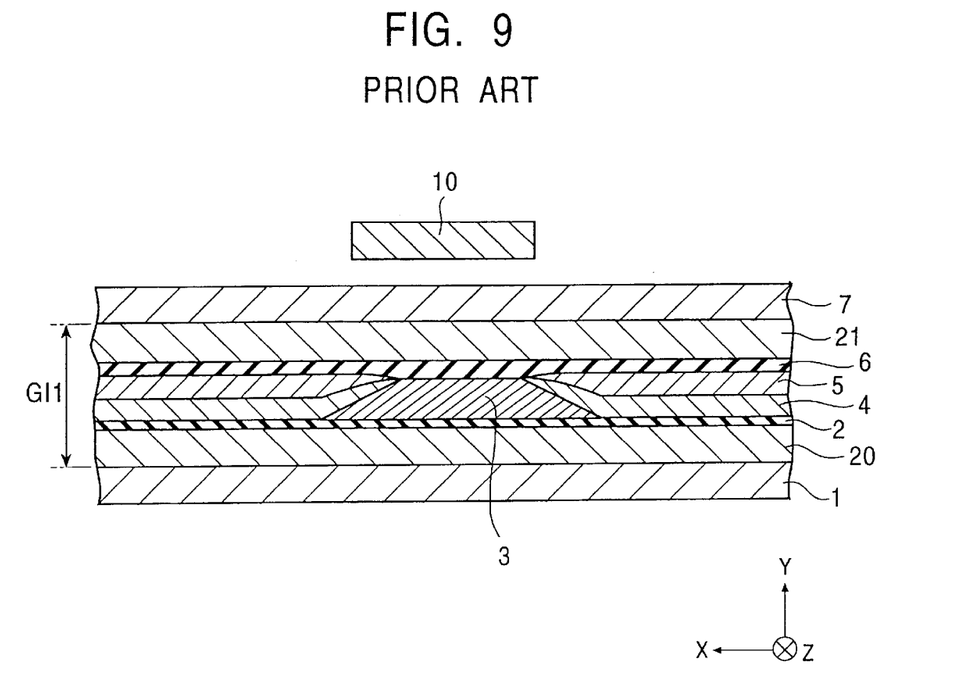
FIG. 9 is a partially enlarged sectional view showing the structure of a second conventional thin film magnetic head.

FIG. 9 shows a prior art obtained by improving the structure of the read head h1 of the thin film magnetic head shown in FIG. 8. FIG. 9 is a partially enlarged sectional view showing the thin film magnetic head viewed from the side opposing a magnetic medium.

As shown in FIG. 9, an antiferromagnetic layer 20 consisting of, e.g., an Ni—Mn (nickel-manganese) alloy on the entire surface of the lower shield layer 1 consisting of a soft magnetic material such as Co (cobalt) or a permalloy. When the lower shield layer 1 and the antiferromagnetic layer 20 are formed to be adjacent to each other, the magnetization of the lower shield layer 1 is put into a single domain state and pinned such that the X direction in FIG. 9 is oriented in an easy axis of magnetization by an exchange anisotropic magnetic field caused by exchange coupling on the boundary surface between the lower shield layer 1 and the antiferromagnetic layer 20.

Similarly, an antiferromagnetic layer 21 is also formed on the lower surface of the upper shield layer 7, and the magnetization of the upper shield layer 7 is put into a single domain state and pinned such that the X direction in FIG. 9 is oriented in an easy axis of magnetization by an exchange anisotropic magnetic field between the upper shield layer 7 and the antiferromagnetic layer 21.

When the magnetization of the lower shield layer 1 and the upper shield layer 7 is put into a single domain state and pinned such that the X direction in FIG. 9 is oriented in the easy axis of magnetization by the exchange anisotropic magnetic fields between the lower shield layer 1 and the antiferromagnetic layer 20 and between the upper shield layer 7 and the antiferromagnetic layer 21, no anisotropic dispersion occurs in the lower shield layer 1 or 7. Therefore, a coercive force in the hard axis of magnetization (direction perpendicular to the drawing paper surface) of the entire thin film magnetic head decreases, so that the magnetic reversibilities of the shield layers 1 and 7 may be improved. As a result, an output from the MR layer of the magnetoresistance element layer 3 is free from Barkhousen nose.

However, in the structure shown in FIG. 9, the lower shield layer 1 and the upper shield layer 7 are put into a single domain state and pinned such that the X direction in FIG. 9 is oriented in the easy axis of magnetization by the exchange anisotropic magnetic fields between the lower shield layer 1 and the antiferromagnetic layer 20 and between the upper shield layer 7 and the antiferromagnetic layer 21. For this reason, the soft magnetic characteristics in the hard axis of magnetization (direction perpendicular to the drawing paper surface) in the lower shield layer 1 and the upper shield layer 7 are degraded, and magnetic permeabilities in the hard axes of magnetization of the shield layers 1 and 7 are degraded. The shield functions of the shield layers 1 and 7 are degraded because of degradation of the magnetic permeabilities. Therefore, the MR layer easily leads recording noise to degrade the reproducing characteristics.

In order to increase the resolution of a leakage magnetic field from a recording medium, the gap length Gl1 determined by the interval between the lower shield layer 1 and the upper shield layer 7 is preferably small. For this purpose, the lower gap layer 2 and the upper gap layer 6 are preferably formed to have as smaller thicknesses as possible. However, in the structure shown in FIG. 9, the antiferromagnetic layer 20 is formed on the upper surface of the lower shield layer 1, and the antiferromagnetic layer 21 is formed on the lower surface of the upper shield layer 7. For this reason, the gap length Gl1 is increased by the thicknesses of the antiferromagnetic layers 20 and 21, and a problem that a narrow gap cannot be designed arises.

SUMMARY OF THE INVENTION

The present invention has been made to solve the above conventional problems, and has as its object to provide a thin film magnetic head in which hard films consisting of a permanent magnet material are formed on both the sides of a lower shield layer and an upper shield layer to put the lower shield layer and the upper shield layer into a single domain state, so that hysteresis is eliminated to decrease a coercive force, the magnetic reversibilities of the shield layers in a direction perpendicular to a recording medium are improved, and the reliability of an output signal from a magnetoresistance element layer is improved.

It is another object of the present invention to provide a thin film magnetic head in which a predetermined interval is formed on the lower or upper side of a lower core layer and an upper core layer to form an antiferromagnetic layer, so that the shield layers in a read track region are put into a single domain state to exhibit preferable soft magnetic characteristics, the magnetic permeabilities of the shield layers can be kept high, and the reliability of a reproduced signal of the magnetoresistance element layer is improved.

According to the present invention, a thin film magnetic head including a magnetoresistance element layer formed on the upper surface of a lower shield layer through a lower gap layer, a hard bias layer for giving a bias magnetic field to the magnetoresistance element layer, a main lead layer for giving a detection current to the magnetoresistance element layer, and an upper shield layer formed on the upper surface of the main lead layer through an upper gap layer, is characterized in that hard films consisting of a permanent magnet material are formed on both the sides of at least one of the shield layers.

According to the present invention, a thin film magnetic head including a magnetoresistance element layer formed on the upper surface of a lower shield layer through a lower gap layer, a hard bias layer for giving a bias magnetic field to the magnetoresistance element layer, a main lead layer for giving a detection current to the magnetoresistance element layer, an upper shield layer formed on the upper surface of the main lead layer through an upper gap layer and having an upper shield function of a read head and a core function on the reading side of an inductive head, an upper core layer opposing the upper shield layer at an opposite position to a recording medium through a magnetic gap, and a coil layer for giving a magnetic field to the upper shield layer and the upper core layer, is characterized in that hard films consisting of a permanent magnet material are formed on both the sides of the lower shield layer and the upper shield layer.

In the present invention, when the saturation magnetization of the lower shield layer and the upper shield layer, the thickness of the lower shield layer, the thickness of the upper shield layer, the residual magnetization of the hard film, and the thickness of the hard film are represented by Ms, L1, L2, Mr, and L3, respectively, a relationship: $Ms \cdot (L1, L2) \leq Mr \cdot L3$ is preferably satisfied.

When the relationship is satisfied, the magnetization of the lower shield layer and the upper shield layer is oriented in an easy axis of magnetization by the residual magnetization Mr of the hard film to be put into a single domain state.

The hard film preferably has a coercive force Hc of not less than 500 Oe (Oersted).

In addition, when the width of the lower shield layer, the width of the upper shield layer, the width of the magnetoresistance element layer, and the width of the upper core layer are represented by a, b, c, and Tw, respectively, a relationship: $Tw < (a, b) \leq 5c$ is preferably satisfied.

When the width a of the lower shield layer and the width b of the upper shield layer are too short (smaller than the track width Tw), the distance between the hard film and the magnetoresistance element layer becomes short, and a leakage magnetic field from the hard film may magnetically interferes with the magnetoresistance element layer. Furthermore, when the widths a and b are too long (5c or more), the entire magnetization (magnetic moments) of the lower shield layer and the upper shield layer is not easily put into a single domain state because of the leakage magnetic field (residual magnetization) from the hard film, and anisotropic dispersion may occur.

According to the present invention, a thin film magnetic head including a magnetoresistance element layer formed on the upper surface of a lower shield layer through a lower gap layer, a hard bias layer for giving a bias magnetic field to the magnetoresistance element layer, a main lead layer for giving a detection current to the magnetoresistance element layer, an upper shield layer formed on the upper surface of the main lead layer through an upper gap layer and having an upper shield function of a read head and a core function on the reading side of an inductive head, an upper core layer opposing the upper shield layer at an opposite position to a recording medium through a magnetic gap, and a coil layer for giving a magnetic field to the upper shield layer and the upper core layer, is characterized in that antiferromagnetic layers are formed on the upper or lower surface of the lower shield layer at a predetermined interval T1, and antiferromagnetic layers are formed on the lower or upper surface of the upper shield layer at a predetermined interval T2.

The antiferromagnetic film preferably consists of an antiferromagnetic material selected from the group consisting of an X—Mn alloy (X is one of Pt, Rh, and Ir) and an X—Mn—Q alloy (X is one of Pt, Rh, and Ir, and Q is at least one of Ni, Pd, Rh, Ru, Ir, Cr, and Co).

Even if a Pt—Mn alloy, a Pt—Mn—Q alloy (Q is at least one of Ni, Pd, Rh, Ru, In, Cr, and Co), a Pd—Mn alloy, or a pd—Mn—Q alloy (Q is at least one of Ni, Pd, Rh, Ru, Ir, Cr, and Co) of the above antiferromagnetic materials is laminated on either one of the upper and lower sides of the shield layer, an effective exchange anisotropic magnetic field can be achieved on the boundary surface between the antiferromagnetic film and the shield layer. When an Ir—Mn alloy or an Ir—Mn—Q alloy (Q is at least one of Ni, Pd, Rh, ru, Ir, Cr, and Co) is laminated on the shield layer, exchange coupling can be achieved on the boundary surface between the antiferromagnetic film and the shield layer can be achieved.

When the width of the magnetoresistance element layer and the width of the upper core layer are represented by c and Tw, respectively, the predetermined intervals T1 and T2 formed between the shield layers and the antiferromagnetic layers preferably satisfy a relationship: $Tw < (T1, T2) \leq 5c$.

When the predetermined intervals T1 and T2 formed between the shield layers and the antiferromagnetic layers are too short (smaller than the track width Tw), i.e., when the width of a portion of the shield layer which is not in contact with the antiferromagnetic layer is too short, the distance between the shield layer (ferromagnetic layer) fixed by the antiferromagnetic layer and the magnetoresistance element layer becomes short, and a leakage magnetic field from the shield layer (ferromagnetic layer) fixed by the antiferromagnetic layer easily magnetically interferes with the magnetoresistance element layer. Also, the shield layer is disadvantageously put into a single domain state and pinned by an exchange anisotropic magnetic field on the boundary surface between the shield layer and the antiferromagnetic layer. In addition, when the predetermined intervals T1 and T2 are too long (5c or more), i.e., when the width (=intervals T1 and T2) of a portion of the shield layer which is not in contact with the antiferromagnetic layer, the shield layer is not easily completely put into a single domain state because of an exchange anisotropic magnetic field generated on the boundary surface between the shield layer and the antiferromagnetic layer.

In the present invention, hard films consisting of a permanent magnet material are formed on both the sides of the shield layer, and the magnetization of the shield layer is oriented in the easy axis of magnetization by the leakage magnetic field (residual magnetization) from the hard films. For this reason, no anisotropic dispersion occurs in the shield layer. Therefore, the hysteresis of the thin film magnetic head is eliminated as a whole, and a coercive force becomes very small.

When the coercive force decreases, the magnetic reversibility of the shield layer in the hard axis of magnetization (direction perpendicular to a recording medium) becomes preferable, and the reliability of a reproduced output signal from the magnetoresistance element layer is improved.

In the present invention, antiferromagnetic layers are formed on the upper or lower surface of the shield layer at a predetermined interval. In the prior art, as shown in FIG. 9, the antiferromagnetic layers 20 and 21 are formed on the upper surface of the lower shield layer 1 and the entire lower surface of the upper shield layer 7, respectively. However, with this structure, the entire magnetization of the shield layer of the shield layer is pinned by an exchange anisotropic magnetic field generated on the boundary surface between the shield layer and the antiferromagnetic layer, and the soft magnetic characteristics of the shield layer is degraded.

Figure 2:
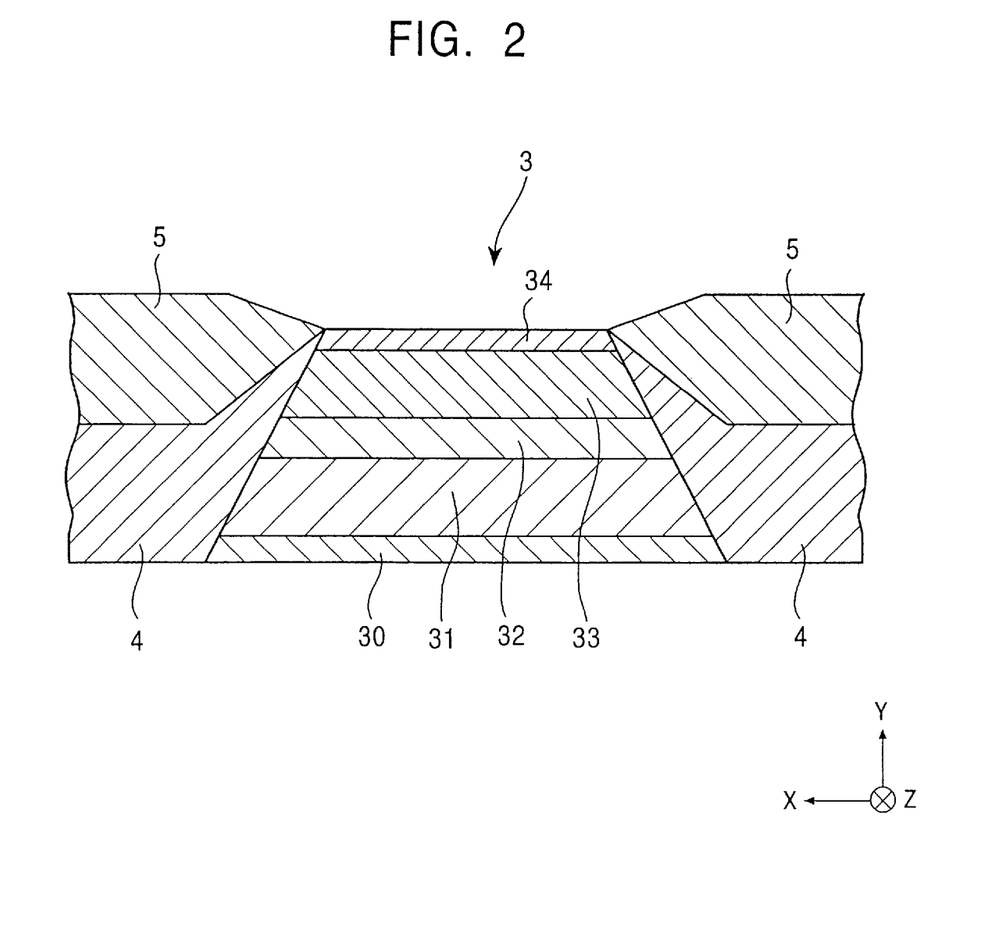
FIG. 2 is an enlarged sectional view showing a structure obtained when a magnetoresistance element layer has AMR (Anisotropic Magnetoresistance).

In the present invention, the structure of the thin film magnetic head shown in FIG. 9 is improved, and, for example, as shown in FIG. 2, antiferromagnetic layers 14 and 15 are formed with predetermined intervals T1 and T2. With this structure, the entire magnetization of the shield layers 1 and 7 is not pinned by an exchange anisotropic magnetic field, and only portions of the shield layers 1 and 7 which are in contact with the antiferromagnetic layers 14 and 15 are pinned by the exchange anisotropic magnetic field. The shield layers 1 and 7 at the portions which are not pinned by the exchange anisotropic magnetic field are put into a single domain state by a magnetic field from the shield layers 1 and 7 which are pinned by an exchange coupling magnetic field to be put into a single domain state. However, since the shield layers are not in contact with the antiferromagnetic layer, the shield layers have soft magnetic characteristics such that the shield layers can be magnetically inverted by a recording magnetic field from a recording medium. Therefore, unlike the prior art, the entire magnetization of the shield layers 1 and 7 is not strongly pinned.

For this reason, the magnetic reversibilities of portions of the shield layers 1 and 7 which are not in contact with the antiferromagnetic layer are preferable, the magnetic permeabilities of the shield layers 1 and 7 increase, and the reliability of a reproduced output signal of the magnetoresistance element layer is improved.

DESCRIPTION OF THE PREFERRED EMBODIMENTS

Figure 1:
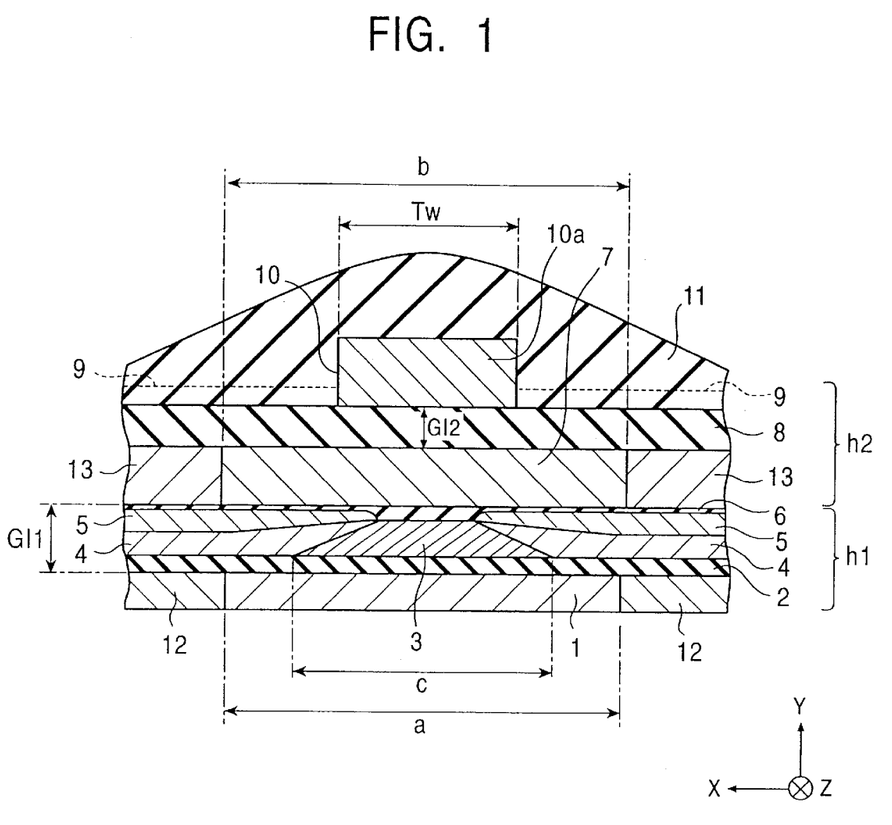
FIG. 1 is an enlarged sectional view of a thin film magnetic head showing the structure of the first embodiment of the present invention.

FIG. 1 shows a thin film magnetic head according to the first embodiment of the present invention, and is an enlarged section viewed from the opposite side to a recording medium. The moving direction of a magnetic recording medium such as a hard disk is represented by a Y direction, and the direction of a leakage magnetic field from the magnetic recording medium is represented by a Z direction.

The thin film magnetic head shown in FIG. 1 is formed on the trailing-side end face of a slider constituting a floating type head, and is constituted by a read head h1 and a recording inductive head h2 which are stacked.

The read head h1 detects a leakage magnetic field from a recording medium such as a hard disk by using a magnetoresistance effect to read recorded signals.

A lower shield layer 1 consisting of a soft magnetic material and having a width a is formed on the trailing-side end face of the slider. The lower shield layer 1 consists of a soft magnetic material such as a permalloy or a Co (cobalt) amorphous alloy having uniaxial anisotropy or an isotropic soft magnetic material such as Sendust.

Hard films 12 are formed on both the sides of the lower shield layer 1. The hard films 12 consist of a permanent magnet material (hard magnetic material) such as a Co—Pt (cobalt-platinum) alloy, a Co—Pd—Cr (cobalt-palladium-chromium) alloy, or a Co—Cr—Ta (cobalt-chromium-tantalum).

The hard films 12 are magnetized in an X direction. In this manner, the lower shield layer 1 is put into a single domain state such that the X direction is oriented in an easy axis of magnetization.

A lower gap layer 2 consisting of a non-magnetic material such as $Al_2O_3$ (alumina) or the like is formed on the upper surface of the lower shield layer 1 and the hard films 12. A magnetoresistance element layer 3 having a width c is formed on the upper surface of the lower gap layer 2. As shown in the enlarged view in FIG. 2, the magnetoresistance element layer 3 has a three-layer structure. This structure is constituted by an SAL layer 31 consisting of a soft magnetic material (Co—Zr—Mo alloy or an Ni—Fe—Nb alloy), an SHUNT layer 32 consisting of a non-magnetic material (e.g., Ta (tantalum)), and an MR layer 33 (Fe—Ni alloy) having an magnetoresistance effect which are sequentially laminated from the bottom. Reference numeral 30 denotes an underlying layer, and 34 denotes a protective layer consisting of Ta. A hard bias layer 4 for giving a bias magnetic field to the MR layer and a main lead layer 5 (W (tungsten) or Cu (copper)) for giving a detection current to the MR layer are formed on both the sides of the magnetoresistance element layer 3.

The hard bias layer 4 is magnetized in the X direction, thereby putting the MR layer 33 of the magnetoresistance element layer 3 into a single domain state in the X direction.

Figure 3:
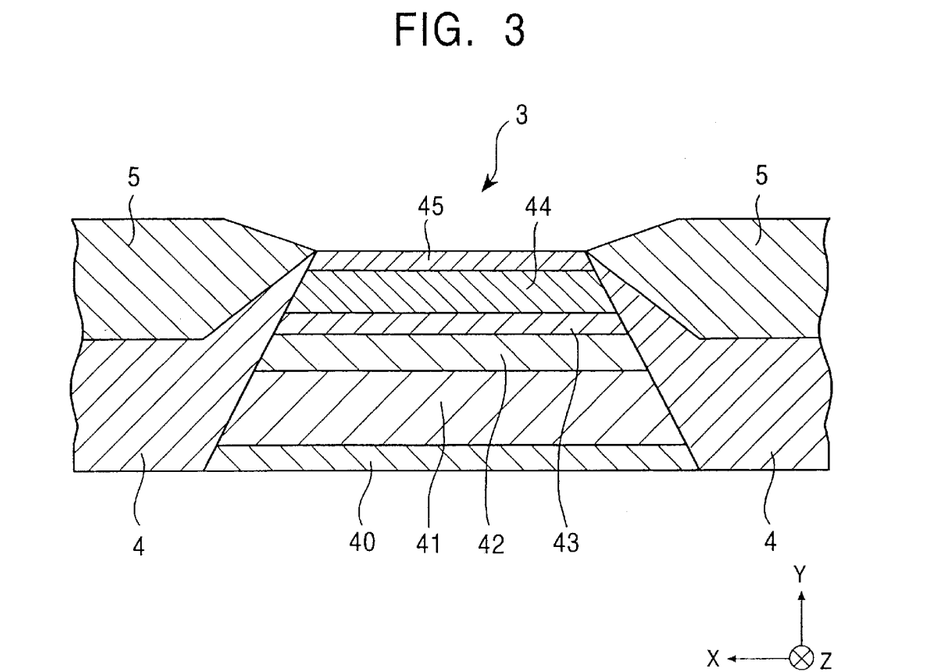
FIG. 3 is an enlarged sectional view showing a structure obtained when a magnetoresistance element layer has Spin-valve type GMR (Giant Magnetoresistance).
Figure 4:
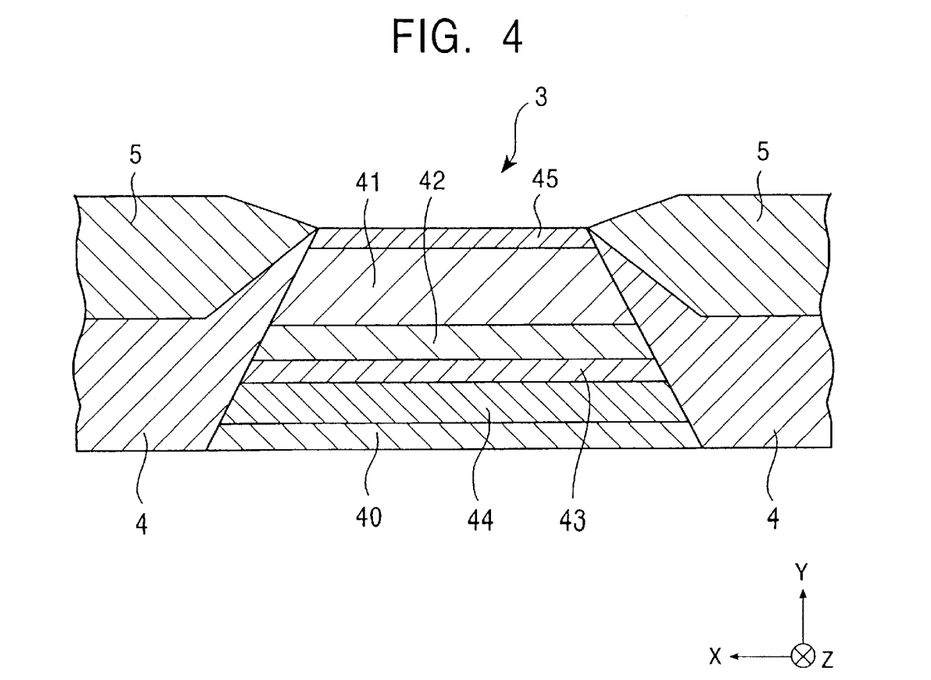
FIG. 4 is an enlarged sectional view showing a structure obtained when a magnetoresistance element layer has Spin-valve type GMR (Giant Magnetoresistance).

FIGS. 3 and 4 are enlarged views showing structures obtained when a single Spin-valve type GMR (Giant Magnetoresistance) element is used as the magnetoresistance element layer 3.

This structure is constituted by four layers, i.e., a free magnetic layer 44, a non-magnetic electrically layer 43, a pinned magnetic layer 42, and an antiferromagnetic layer 41. Reference numerals 41 and 45 denote underlying layers or protective layers consisting of a non-magnetic material such as Ta; 4, a hard bias layer; and 5, a main lead layer for giving a detection current to the free magnetic layer 44, the non-magnetic electrically layer 43, and the pinned magnetic layer 42.

The pinned magnetic layer 42 and the antiferromagnetic layer 41 are formed to be in contact with each other. The pinned magnetic layer 42 is put into a single domain state in the Z direction by an exchange anisotropic magnetic field generated by exchange coupling on the boundary surface of the pinned magnetic layer 42 and the antiferromagnetic layer 41 to pin the direction of magnetization in the Z direction. When heat treatment is performed while giving the exchange anisotropic magnetic field, the exchange coupling occurs on the boundary surface between the antiferromagnetic layer 41 and the pinned magnetic layer 42. The free magnetic layer 44 is put into a single domain state in the X direction by the hard bias layers 4.

When a leakage magnetic field from a magnetic recording medium is given to the single Spin-valve type element in the Z direction, the direction of magnetization of the free magnetic layer 44 is changed from the X direction to the Z direction. An electric resistance is changed by the relationship between a change in direction of magnetization in the free magnetic layer 44 and the pinned magnetization direction of the pinned magnetic layer 42. By a change in voltage based on the change in electric resistance, a leakage magnetic field from the magnetic recording medium is detected.

Figure 5:
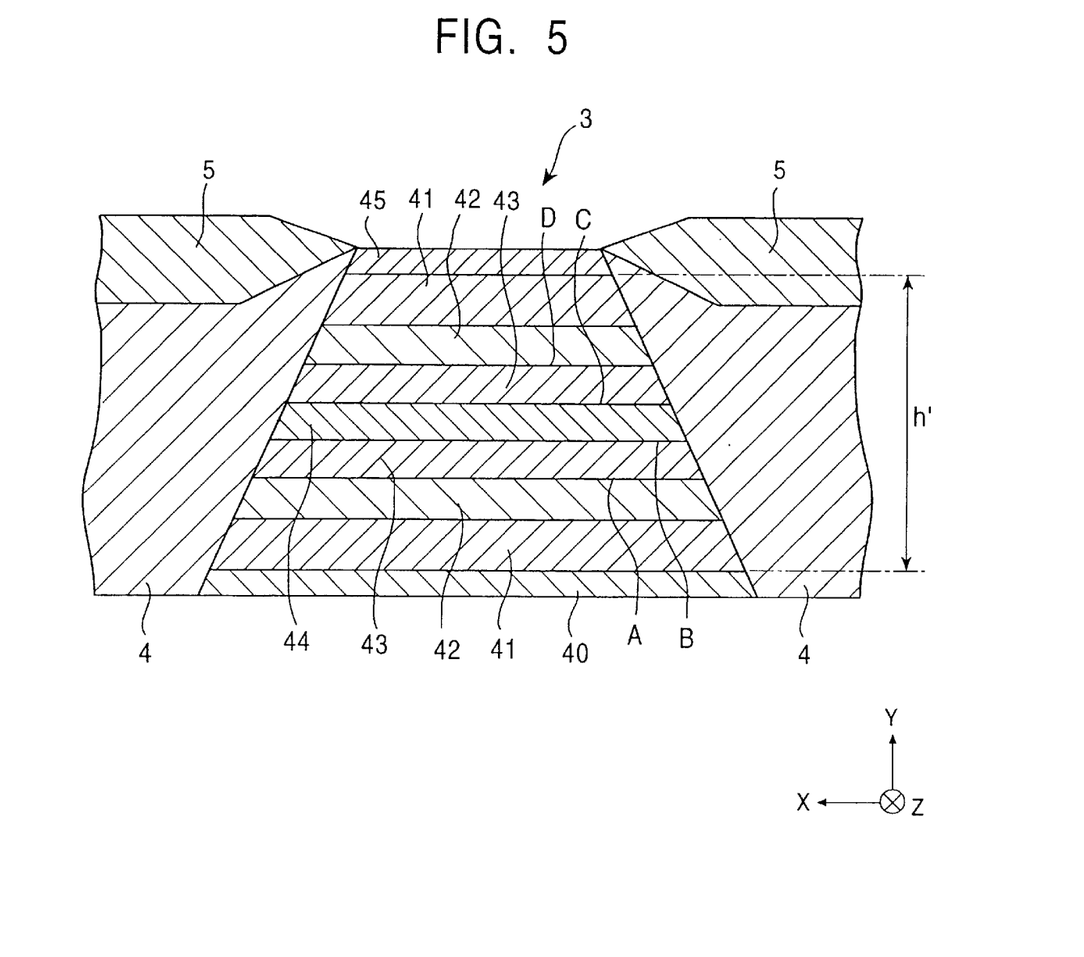
FIG. 5 is an enlarged sectional view showing a structure obtained when a magnetoresistance element layer has Dual Spin-valve type GMR (Giant Magnetoresistance).

FIG. 5 is a sectional view showing a structure obtained when a dual Spin-valve type thin film is used as the magnetoresistance element layer 3.

In the dual Spin-valve type thin film element, the non-magnetic electrically layers 43, the pinned magnetic layers 42, and the antiferromagnetic layers 41 are symmetrically laminated on the upper and lower surfaces of the free magnetic layer 44. The direction of magnetization of the free magnetic layer 44 is oriented in the X direction by the hard bias layer 4, and the directions of magnetization of the pinned magnetic layers 42 are put into a single domain state in the Z direction and pinned by an exchange anisotropic magnetic field generated by exchange coupling on the boundary surfaces between the pinned magnetic layers 42 and the antiferromagnetic layers 41.

When the direction of magnetization of the free magnetic layer 44 is changed from the X direction to the Z direction by the Z-direction leakage magnetic field from the recording medium, an electric resistance changes.

In the Spin-valve type thin film element, when the direction of magnetization of the free magnetic layer 44 is changed from the X direction to the Z direction, electrons to be moved from one of the free magnetic layer 44 and the pinned magnetic layer 42 to the other are scattered on the boundary surface between the non-magnetic electrically layer 43 and the free magnetic layer 44 or the boundary surface between the non-magnetic electrically layer 43 and the pinned magnetic layer 42 to change an electric resistance. By a change in voltage based on the change in electric resistance, a leakage magnetic field from the magnetic recording medium is detected.

When an angle between the direction of magnetization of the free magnetic layer 44 and the direction of magnetization of the pinned magnetic layer 42 is maximum, i.e., when these directions are antiparallel to each other, the electric resistance exhibits the maximum value. When the direction of magnetization of the free magnetic layer 44 and the direction of magnetization of the pinned magnetic layer 42 coincide with each other, the electric resistance exhibits the minimum value. When a leakage magnetic field from the recording medium is given, as a resistance change rate: {(maximum voltage−minimum voltage)/minimum voltage} increases, the characteristics of the Spin-valve type thin film element becomes preferable.

Furthermore, an upper gap layer 6 consisting of alumina or the like is formed on the upper surface of the magnetoresistance element layer 3 and the main lead layer 5.

An upper shield layer (lower core layer) 7 having an upper shield function of the read head h1 and a core function on the reading side of the inductive head h2 is formed on the upper surface of the upper gap layer 6. As shown in FIG. 1, the upper shield layer 7 is formed to have a width b which is almost equal to the width of the lower shield layer 1.

Hard films 13 are formed on both the sides of the upper shield layer 7. Like the hard films 12 formed on both the sides of the lower shield layer 1, the hard films 13 consist of a permanent magnet material.

The hard films 13 are magnetized in the X direction. For this reason, the magnetization of the upper shield layer 7 is put into a single domain state such that the X direction is oriented in an easy axis of magnetization.

Here, when the saturation magnetization of the lower shield layer 1 and the upper shield layer 7, the thickness of the lower shield layer 1, the thickness of the upper shield layer 7, the residual magnetization of the hard films 12 and 13, and the thicknesses of the hard films 12 and 13 are represented by Ms, L1, L2, Mr, and L3, respectively, a relationship: Ms·(L1, L2)≦Mr·L3 is preferably satisfied.

When the relationship is satisfied, the magnetization of the lower shield layer 1 and the upper shield layer 7 may be easily put into a single domain state by the residual magnetization of the hard films 12 and 13.

The hard films 12 and 13 preferably have a coercive force Hc of 500 Oe (Oersted) or more. When the coercive forces of the hard films 12 and 13 are increased, the directions of magnetization are stably held without changing the directions of magnetization (X direction in the drawings) of the hard films 12 and 13 by an external magnetic field or the like.

In addition, when the width of a distal end portion 10a of the upper core layer 10 (to be described later) is represented by Tw (track width), the width a of the lower shield layer 1, the width b of the upper shield layer 7, the width c of the magnetoresistance element layer 3, and the width Tw preferably establish Tw<(a, b)≦5c.

When the widths a and b of the shield layers 1 and 7 are too short (smaller than the track width Tw), the distances between the hard films 12 and 13 and the magnetoresistance element layer 3 are too short, leakage magnetic fields from the hard films 12 and 13 may magnetically interfere with the magnetoresistance element layer 3.

When the widths a and b are too long (5c or more), the shield layers 1 and 7 are not easily completely put into a single domain state because of leakage magnetic fields from the hard films 12 and 13, and anisotropic dispersion may occur in the shield layers 1 and 7. When the anisotropic dispersion occurs, the coercive force increases, and the magnetic reversibilities of the MR layer 33 or the free magnetic layer of the magnetoresistance element layer 3 and the shield layers 1 and 7 are degraded.

As shown in FIG. 1, a gap layer (non-magnetic material layer) 8 consisting of alumina or the like is formed on the upper surface of the upper shield layer (lower core layer) 7 and the hard films 13, and a coil layer 9 which is patterned to have a two-dimensionally spiral shape is formed on the upper surface of the gap layer 8 through an insulating layer (not shown) consisting of polyimide or a resist material. The coil layer 9 consists of a non-magnetic electrically conductive material such as Cu (copper) having a low electric resistance.

The coil layer 9 is surrounded by an insulating layer (not shown) consisting of polyimide or a resist material, and an upper core layer 10 consisting of a soft magnetic material and serving as a core portion on the trailing side of the inductive head h2 is formed on the upper surface of the insulating layer. The width Tw of the upper core layer 10 corresponds to a track width.

As shown in FIG. 1, the distal end portion 10a of the upper core layer 10 opposes the upper surface of the upper shield layer 7 through the non-magnetic material layer 8 to form a magnetic gap, having a magnetic gap length Gl2, for giving a recording magnetic field to a recording medium. A protective layer 11 consisting of alumina or the like is formed on the upper core layer 10.

In the inductive head h2, a recording current is given to the coil layer 9, a recording magnetic field is induced from the coil layer 9 to the upper shield layer 7 and the upper core layer 10. At the magnetic gap length Gl2, a magnetic signal is recorded on a recording medium such as a hard disk by a leakage magnetic field between the upper shield layer 7 and the distal end portion 10a of the upper core layer 10.

In the inductive head h2, in order to be able to record a magnetic signal on the recording medium such as a hard disk at a high density, the magnetic gap length Gl2 of the inductive head h2 is made as shorter as possible.

In the present invention, the hard films 12 and 13 consisting of a permanent magnet material are formed on both the sides of the lower shield layer 1 and the upper shield layer 7, and the lower shield layer 1 and the upper shield layer 7 are put into a single domain state by leakage magnetic fields (residual magnetization) from contact surfaces between the shield layers 1 and 7 and the hard films 12 and 13 such that the X direction is oriented in an easy axis of magnetization. For this reason, the hysteresis of the thin film magnetic head as a whole is eliminated, and a coercive force becomes very small. Therefore, the magnetic reversibilities of the shield layers 1 and 7 in the hard axis of magnetization (vertical direction in FIG. 1) are preferable, and the reliability of a reproduced output signal from the magnetoresistance element layer 3 can be improved. In particular, this head can cope with a high-frequency region.

Since the magnetic reversibilities of the shield layers 1 and 7 are preferable, a shield function for shielding the MR layer or the free magnetic layer of the magnetoresistance element layer 3 from recording noise is improved.

In addition, an advantage that the selectivity of shield materials is improved can be expected.

Figure 6:
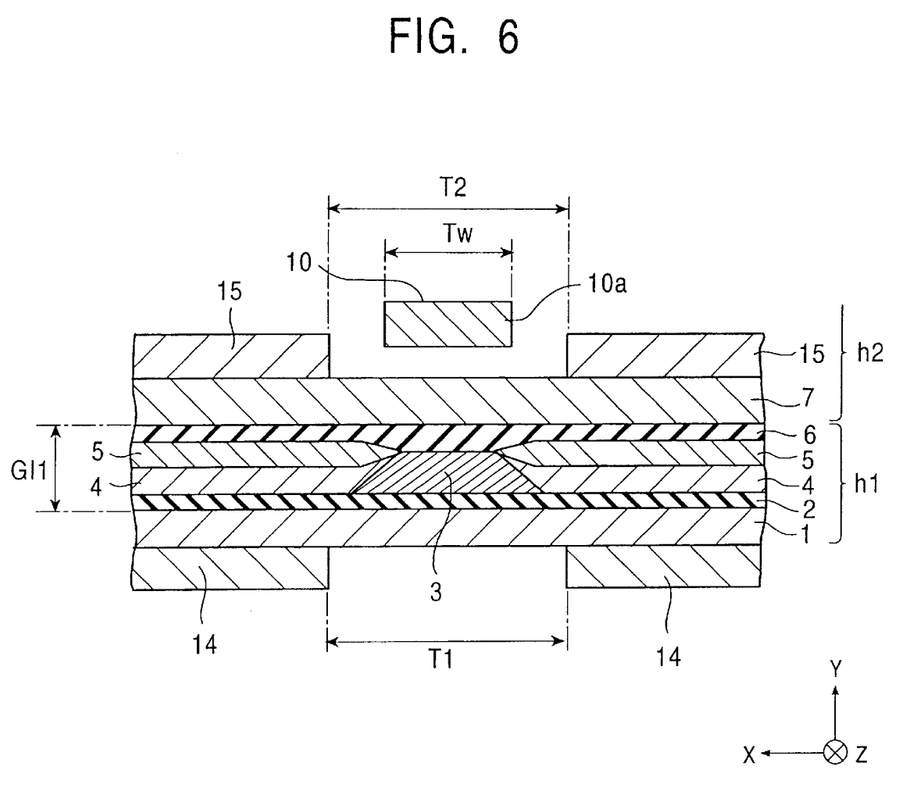
FIG. 6 is a partially enlarged sectional view of a thin film magnetic head showing the structure of the second embodiment of the present invention.
Figure 7:
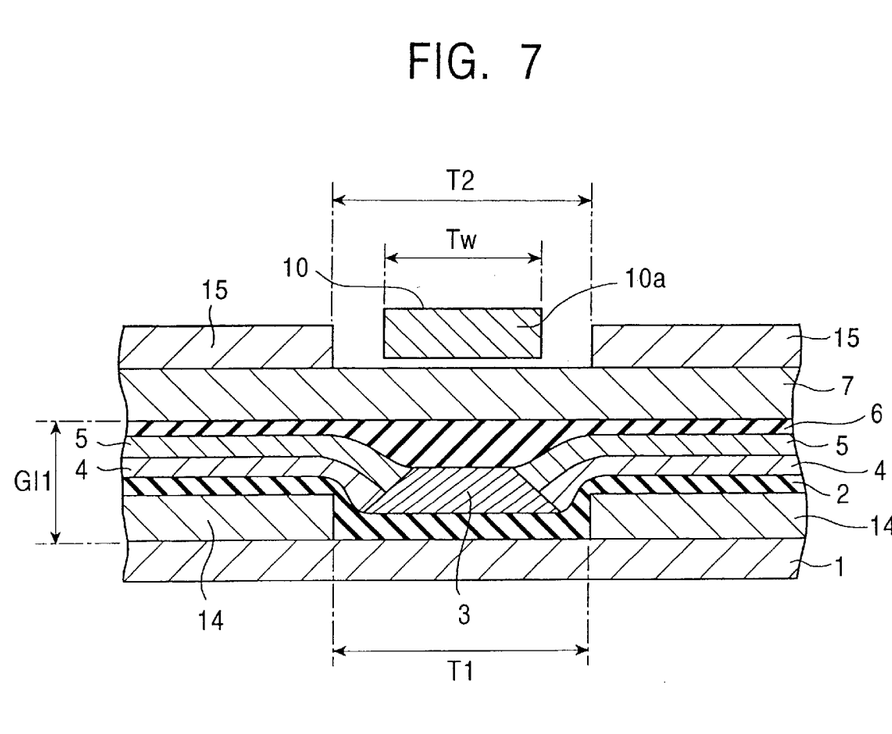
FIG. 7 is a partially enlarged sectional view of a thin film magnetic head showing the structure of the third embodiment of the present invention.

FIG. 6 shows a thin film magnetic head according to the second embodiment of the present invention, and is a partially enlarged sectional view showing the thin film magnetic head viewed from the side opposing a recording medium. FIG. 7 shows a thin film magnetic head according to the third embodiment of the present invention, and is a partially enlarged sectional view showing the thin film magnetic head viewed from the side opposing a recording medium. The moving direction of a magnetic recording medium such as a hard disk is represented by a Y direction, and the direction of a leakage magnetic field from the magnetic recording medium is represented by a Z direction.

As shown in FIG. 7, on the lower side of a lower shield layer 1 consisting of a permalloy, Co (cobalt), or an Ni—Fe—Co (Nickel-iron-cobalt) alloy, antiferromagnetic layers 14 are formed at a predetermined interval T1.

When heat treatment is performed in a magnetic field having a predetermined size in a state wherein the antiferromagnetic layers 14 and the lower shield layer 1 are laminated, an exchange anisotropic magnetic field can be obtained on the boundary surfaces between the antiferromagnetic layers 14 and the lower shield layer 1, and the direction of magnetization of the lower shield layer 1 on the antiferromagnetic layers 14 is pinned to the X direction. On the other hand, the lower shield layer 1 on a portion, having the width T1, where no antiferromagnetic layers 14 are formed is put into a single domain state by a magnetic field from the lower shield layer 1 whose direction of magnetization is pinned to the X direction by exchange anisotropic magnetic fields between the lower shield layer 1 and the antiferromagnetic layers 14, and the direction of magnetization of the lower shield layer 1 is oriented in the X direction. For this reason, the entire lower shield layer 1 is gradually put into a single domain state in the X direction. When the predetermined interval T1 is formed between the antiferromagnetic layers 14, the magnetization of the lower shield layer 1 in the range of the interval T1 is not pinned, and the lower shield layer 1 is put into a single domain state with preferable soft magnetic characteristics. For this reason, the magnetic reversibility of the lower shield layer 1 in the direction perpendicular to the drawing paper surface is preferable.

A lower gap layer 2 consisting of a non-magnetic material is formed on the upper surface of the lower shield layer 1, and a magnetoresistance element layer 3 is laminated on the upper surface of the lower gap layer 2. A hard bias layer 4 and a main lead layer 5 are laminated on both the sides of the magnetoresistance element layer 3, and an upper gap layer 6 consisting of a non-magnetic material is formed on the upper surface of the main lead layer 5.

An upper shield layer (lower core layer) 7 having an upper shield function of a read head h1 and a core function on the reading side of an inductive head h2 is formed on the upper surface of the upper gap layer 6.

Antiferromagnetic layers 15 are formed on the upper surface of the upper shield layer 7 at an interval having a predetermined width T2. Portions of the upper shield layer 7 which are in contact with the antiferromagnetic layers 15 are put into a single domain state and pinned by exchange anisotropic magnetic fields on the boundary surfaces between the upper shield layer 7 and the antiferromagnetic layers 15, and the magnetization of a portion of the upper shield layer 7 which is not in contact with the antiferromagnetic layer is oriented such that the X direction becomes an easy axis of magnetization. Therefore, the upper shield layer 7 is entirely put into a single domain state in the X direction.

In addition, on the upper surface of the antiferromagnetic layers 15 and the upper shield layer 7 having the width T2, a distal end portion 10a of an upper core layer 10 is formed at a position opposing the upper shield layer 7 through a gap layer (not shown). The distal end portion 10a of the upper core layer 10 is formed to have a width Tw. The width Tw corresponds to a track width.

When the structure of the thin film magnetic head shown in FIG. 7 is compared with the structure of the thin film magnetic head shown in FIG. 6, the thin film magnetic heads shown in FIGS. 6 and 7 have the same structure except that the antiferromagnetic layers 14 are formed at the interval having the predetermined width T1 on the lower shield layer 1 in the thin film magnetic head shown in FIG. 7.

Like the lower shield layer 1 and the upper shield layer 7 shown in FIG. 6, the lower shield layer 1 and the upper shield layer 7 of the thin film magnetic head shown in FIG. 7 are put into a single domain state in the X direction by exchange anisotropic magnetic fields on the boundary surfaces between the shield layers 1 and 7 and the antiferromagnetic layers 14 and 15.

The structure of the thin film magnetic head shown in FIG. 6 excels the structure of the thin film magnetic head shown in FIG. 7 at achieving a narrow gap.

As shown in FIG. 6, it is understood that a gap length Gl1 determined by the interval between the lower shield layer 1 and the upper shield layer 7 is shorter than the gap length Gl1 shown in FIG. 7. This is because the antiferromagnetic layers 14 are formed on the lower shield layer 1 in FIG. 7. The gap length Gl1 shown in FIG. 7 is larger than the gap length Gl1 shown in FIG. 6 by the thicknesses of the antiferromagnetic layers 14.

When the gap length Gl1 decreases, the resolution of a leakage magnetic field from a recording medium can be improved.

As another embodiment, the following structure may be used. That is, the antiferromagnetic layers 15 formed on the upper surface of the upper shield layer 7 shown in FIG. 6 are formed on the lower surface of the upper shield layer 7, and the antiferromagnetic layers 14 and 15 are formed on the lower surface of the shield layers 1 and 7.

In the present invention, as an antiferromagnetic material constituting the antiferromagnetic layers 14 and 15, a Pt—Mn (Platinum-manganese) alloy, a Pt—Mn—Q (Q is at least one of Ni, Pd, Rh, Ru, Ir, Cr, and Co) alloy, an Ir—Mn—Q alloy (Q is at least one of Ni, Pd, Rh, Ru, Ir, Cr, and Co), an Rh—Mn (Rhodium-manganese) alloy, or the like exemplified. The Ir—Mn alloy or the Ir—Mn—Q alloy (Q is at least one of Ni, Pd, Rh, Ru, Ir, Cr, and Co) of the above antiferromagnetic materials cannot perform exchange coupling when a shield layer is formed on the antiferromagnetic layer consisting the corresponding material. More specifically, as shown in FIG. 2, when the lower shield layer 1 is formed on the antiferromagnetic layers 14, the Pt—Mn alloy or the Rh—Mn alloy which can generate an exchange anisotropic magnetic field even if the antiferromagnetic layer is laminated on either one of the upper and lower surfaces of the shield layers 1 and 7 is preferably used.

Any one of the antiferromagnetic materials described above can be used in the antiferromagnetic layers 15 formed on the upper surface of the upper shield layer 7 shown in FIG. 6 and the antiferromagnetic layers 14 and 15 shown in FIG. 7.

In addition to the above antiferromagnetic materials, an Fe—Mn (Iron-manganese) alloy and an Ni—Mn (Nickel-manganese) alloy which are conventionally used may be used.

In the present invention, the antiferromagnetic layers 14 are formed on at least the upper or lower surface of the lower shield layer 1 at an interval having the predetermined width T1, and the antiferromagnetic layers 15 are formed on the upper or lower surface of the upper shield layer 7 at an interval having the predetermined width T2. For this reason, portions of the shield layers 1 and 7 which are in contact with the antiferromagnetic layers 14 and 15 are pinned and put into a single domain state by the exchange anisotropic magnetic fields on the boundary surfaces between the shield layers 1 and 7 and the antiferromagnetic layers 14 and 15 such that the X direction becomes an easy axis of magnetization. By magnetic fields from the portions of the shield layers 1 and 7 which are pinned and put into a single domain state by exchange coupling magnetic fields such that the X direction becomes the easy axis of magnetization, the magnetization of portions of the shield layers 1 and 7 which are not in contact with the antiferromagnetic layers 14 and 15 is oriented such that the X direction becomes the easy axis of magnetization, and is put into a single domain state. Therefore, the shield layers 1 and 7 are entirely put into a single domain state. Since the antiferromagnetic layers 14 and 15 are formed at the predetermined intervals T1 and T2, respectively, preferable soft magnetic characteristics can be achieved without pinning the magnetization of the shield layers 1 and 7 in the ranges of the intervals T1 and T2. For this reason, the magnetic reversibilities of the shield layers 1 and 7 in the hard axis of magnetization (direction perpendicular to the drawing paper surface) become preferable.

Therefore, the magnetic permeabilities of the shield layers 1 and 7 are improved, and a shield function for shielding the MR layer of the magnetoresistance element layer 3 from recording noise is improved, thereby achieving preferable reproducing characteristics.

When the predetermined intervals T1 and T2 formed between the antiferromagnetic layers 14 (15) are properly adjusted, even if the shield layers 1 and 7 are decreased in thickness, the magnetization of the shield layers in the range of the intervals T1 and T2 is not pinned. For this reason, the shield layers 1 and 7 has preferable soft magnetic characteristics such that a magnetic field from a recording medium can be magnetically inverted, and the magnetic permeabilities of the shield layers 1 and 7 can be kept high. In this manner, the present invention can cope with decreases in thickness of the shield layers 1 and 7.

The predetermined widths T1 and T2 formed between the antiferromagnetic layers 14 (15), the width c of the magnetoresistance element layer 3, and the track width Tw preferably satisfy a relationship: Tw<(T1, T2)≦5c.

When the widths T1 and T2 are too short (smaller than the track width Tw), the shield layers 1 and 7 are pinned such that the X direction becomes an easy axis of magnetization, and the soft magnetic characteristics of the shield layers 1 and 7 in the hard axis of magnetization are degraded. Therefore, the magnetic permeabilities of the shield layers 1 and 7 in the hard axis of magnetization are degraded. The following problem also arises. That is, the distances between the antiferromagnetic layers 14 and 15 and the magnetoresistance element layer 3 decrease, leakage magnetic fields from the shield layers 1 and 7 (ferromagnetic layers) pinned by the antiferromagnetic layers 14 and 15 easily magnetically interfere with the magnetoresistance element layer 3.

When the widths T1 and T2 are too long (5c or more), the widths (=intervals T1 and T2) of the shield layers 1 and 7 which are not magnetized in the X direction by the exchange anisotropic magnetic fields on the boundary surfaces between the shield layers 1 and 7 and the antiferromagnetic layers 14 and 15 become too large, and the shield layers are not easily put into a single domain state as a whole. Therefore, a problem that anisotropic dispersion occurs in the shield layers 1 and 7 easily arises.

In the present invention, the thin film magnetic head in which the read head h1 and the inductive head h2 are stacked has been described above. However, the above arrangement can also be applied to the shield layers of a thin film magnetic head constituted by only a read head h1.

According to the present invention described above, hard films consisting of a permanent magnet material are formed on both the sides of a shield layer, and the magnetization of the shield layer is oriented by a leakage magnetic field (residual magnetization) from the hard film such that an X direction becomes an easy axis of magnetization, and is put into a single domain state. For this reason, no anisotropic dispersion occurs in the shield layer. Therefore, the hysteresis of the thin film magnetic head is eliminated as a whole, and a coercive force becomes very small.

When the shield layer is put into a single domain state, and the coercive force decreases, the magnetic reversibility of the shield layer in the hard axis of magnetization (direction perpendicular to a recording medium) becomes preferable, and the reliability of a reproduced output from the magnetoresistance element layer is improved.

In the present invention, antiferromagnetic layers are formed on the upper or lower surface of the shield layer at a predetermined interval. For this reason, the entire magnetization of the shield layers 1 and 7 is not pinned by an exchange anisotropic magnetic field, and only portions of the shield layers which are in contact with the antiferromagnetic layers are pinned by an exchange anisotropic magnetic field. The magnetization of portions of the shield layers which are not in contact with the antiferromagnetic layers is oriented by magnetic fields from the shield layers whose magnetization is pinned by the exchange anisotropic magnetic field, and is gradually put into a single domain state. For this reason, soft magnetic characteristics in the this case are not poorer than those in a case wherein the entire magnetization of the shield layers 1 and 7 is pinned by an exchange anisotropic magnetic field and put into a single domain state. Therefore, the magnetic reversibility of the shield layer in the hard axis of magnetization is improved, and the magnetic permeability of the shield layer increases.

When the magnetic permeability increases, a shield function for shielding an MR layer or a free magnetic layer having an magnetoresistance effect from recording noise becomes preferable, and reproducing characteristics are improved.

What is claimed are:

1. A thin film magnetic head comprising:
   (a) a magnetoresistance element layer for changing its electric resistance in response to a change in the direction of an external leakage magnetic field;
   (b) a pair of hard bias layers formed respectively on longitudinal sides of said magnetoresistance element layer for imposing a longitudinal bias on said magnetoresistance element layer;
   (c) a pair of main lead layers formed respectively on longitudinal sides of said magnetoresistance element layer for flowing a detection current through said magnetoresistance element layer;
   (d) an upper shield layer formed on an upper side of said magnetoresistance element layer and spaced therefrom by an upper gap layer formed therebetween;
   (e) a lower shield layer formed on a lower side of said magnetoresistance element layer and spaced therefrom by a lower gap layer formed therebetween; and
   (f) a pair of permanent magnet layers formed on longitudinal sides of at least one of said upper shield layer and said lower shield layer in such a manner to sandwich the same layer(s).

2. A thin film magnetic head according to claim 1, further comprising an upper core layer formed on an upper side of said upper shield layer and spaced therefrom by a magnetic gap formed therebetween, wherein relationship of Tw<(a, b)≦5c is satisfied, where a represents the width of said lower shield layer; b represents the width of said upper shield layer; c represents the width of said magnetoresistance element layer; and Tw represents the width of said upper core layer.

3. A thin film magnetic head according to claim 1, wherein said permanent magnet layers have a coercive force Hc of not less than 500 Oe (Oersted).

4. A thin film magnetic head according to claim 3, further comprising an upper core layer formed on an upper side of said upper shield layer and spaced therefrom by a magnetic gap formed therebetween, wherein a relationship of Tw<(a, b)≦5c is satisfied, where a represents the width of said lower shield layer; b represents the width of said upper shield layer; c represents the width of said magnetoresistance element layer; and Tw represents the width of said upper core layer.

5. A thin film magnetic head according to claim 1, wherein a relationship of Ms·(L1, L2)≦Mr·L3 is satisfied, where Ms represents the saturation magnetization of said lower shield layer and said upper shield layer; L1 represents the thickness of said lower shield layer; L2 represents the thickness of said upper shield layer; Ms represents the residual magnetization of said permanent magnet layers; and L3 represents the thickness of said permanent magnet layers.

6. A thin film magnetic head according to claim 5, wherein said permanent magnet layers have a coercive force Hc of not less than 500 Oe (Oersted).

7. A thin film magnetic head according to claim 6, further comprising an upper core layer formed on an upper side of said upper shield layer and spaced therefrom by a magnetic gap formed therebetween, wherein a relationship of Tw<(a, b)≦5c is satisfied, where a represents the width of said lower shield layer; b represents the width of said upper shield layer; c represents the width of said magnetoresistance element layer; and Tw represents the width of said upper core layer.

8. A thin film magnetic head according to claim 5, further comprising an upper core layer formed on an upper side of said upper shield layer and spaced therefrom by a magnetic gap formed therebetween, wherein a relationship of Tw<(a, b)≦5c is satisfied, where a represents the width of said lower shield layer; b represents the width of said upper shield layer; c represents the width of said magnetoresistance element layer; and Tw represents the width of said upper core layer.

9. A thin film magnetic head according to 1, wherein said permanent magnet layers are made of a material selected from the group consisting of a Co—Pt alloy, a Co—Pt—Cr alloy and a Co—Cr—Ta alloy.

10. A thin film magnetic head comprising:
    (a) a magnetoresistance element layer for changing its electric resistance in response to a change in the direction of an external leakage magnetic field;
    (b) a pair of hard bias layers formed respectively on longitudinal sides of said magnetoresistance element layer for imposing a longitudinal bias on said magnetoresistance element layer;
    (c) a pair of main lead layers formed respectively on longitudinal sides of said magnetoresistance element layer for flowing a detection current through said magnetoresistance element layer;
    (d) an upper shield layer formed on an upper side of said magnetoresistance element layer and spaced therefrom by an upper gap layer formed therebetween;
    (e) a lower shield layer formed on a lower side of said magnetoresistance element layer and spaced therefrom by a lower gap layer formed therebetween;
    (f) a pair of permanent magnet layers formed on longitudinal sides of at least one of said upper shield layer or said lower shield layer in such a manner to sandwich the same layer(s); and
    (g) an upper core layer formed on an upper side of said upper shield layer and spaced therefrom by a magnetic gap formed therebetween, said upper shield layer serving as a lower core and forming, together with said upper core, an inductive head;
    (h) a coil layer for giving a magnetic field to said inductive head.

11. A thin film magnetic head according to claim 10, wherein said permanent magnet layers have a coercive force Hc of not less than 500 Oe (Oersted).

12. A thin film magnetic head according to claim 11, wherein a relationship of Tw<(a, b)≦5c is satisfied, where a represents the width of said lower shield layer; b represents the width of said upper shield layer; c represents the width of said magnetoresistance element layer; and Tw represents the width of said upper core layer.

13. A thin film magnetic head according to claim 10, wherein a relationship of Ms·(L1, L2)≦Mr·L3 is satisfied, where Ms represents the saturation magnetization of said lower shield layer and said upper shield layer; L1 represents the thickness of said lower shield layer; L2 represents the thickness of said upper shield layer; Ms represents the residual magnetization of said permanent magnet layers; and L3 represents the thickness of said permanent magnet layers.

14. A thin film magnetic head according to claim 13, wherein said permanent magnet layers have a coercive force Hc of not less than 500 Oe (Oersted).

15. A thin film magnetic head according to claim 14, wherein a relationship of Tw<(a, b)≦5c is satisfied, where a represents the width of said lower shield layer; b represents the width of said upper shield layer; c represents the width of said magnetoresistance element layer; and Tw represents the width of said upper core layer.

16. A thin film magnetic head according to claim 13, wherein a relationship of Tw<(a, b)≦5c is satisfied, where a represents the width of said lower shield layer; b represents the width of said upper shield layer; c represents the width of said magnetoresistance element layer; and Tw represents the width of said upper core layer.

17. A thin film magnetic head according to claim 10, wherein a relationship of Tw<(a, b)≦5c is satisfied, where a represents the width of said lower shield layer; b represents the width of said upper shield layer; c represents the width of said magnetoresistance element layer; and Tw represents the width of said upper core layer.

18. A thin film magnetic head according to 10, wherein said permanent magnet layers are made of a material selected from the group consisting of a Co—Pt alloy, a Co—Pt—Cr alloy and a Co—Cr—Ta alloy.

19. A thin film magnetic head comprising:

(a) a magnetoresistance element layer for changing its electric resistance in response to a change in the direction of an external leakage magnetic field;

(b) a pair of hard bias layers formed respectively on longitudinal sides of said magnetoresistance element layer for imposing a longitudinal bias on said magnetoresistance element layer;

(c) a pair of main lead layers formed respectively on longitudinal sides of said magnetoresistance element layer for flowing a detection current through said magnetoresistance element layer;

(d) an upper shield layer formed on an upper side of said magnetoresistance element layer and spaced therefrom by an upper gap layer formed therebetween;

(e) a lower shield layer formed on a lower side of said magnetoresistance element layer and spaced therefrom by a lower gap layer formed therebetween;

(f) an upper core layer formed on an upper side of said upper shield layer and spaced therefrom by a magnetic gap formed therebetween, said upper shield layer serving as a lower core and forming, together with said upper core, an inductive head;

(g) a coil layer for giving a magnetic field to said inductive head;

(h) a first pair of antiferromagnetic layers formed at a first predetermined interval T1 on either an upper or lower surface of said lower shield layer; and (i) a second pair of antiferromagnetic layers formed at a second predetermined interval T2 on either an upper or lower surface of said upper shield layer.

20. A thin film magnetic head according to claim 19, wherein said first and second pairs of antiferromagnetic layers made of an antiferromagnetic material selected from the group consisting of an X—Mn alloy (X is one of Pt, Rh, and Ir) and an X—Mn—Q alloy (X is one of Pt, Rh, and Ir, and Q is at least one of Ni, Pd, Rh, Ru, Ir, Cr, and Co).

21. A thin film magnetic head according to claim 20, wherein a relationship of Tw<(T1, T2)≦5c is satisfied, where c represents the width of said magnetoresistance element layer; and Tw represents the width of said upper core layer.

22. A thin film magnetic head according to claim 19, wherein a relationship of Tw<(T1, T2)≦5c is satisfied, where c represents the width of said magnetoresistance element layer; and Tw represents the width of said upper core layer.

* * * * *